(12) United States Patent
Hwang et al.

(10) Patent No.: US 11,848,115 B2
(45) Date of Patent: Dec. 19, 2023

(54) DISMANTLING METHOD OF RADIOACTIVE STRUCTURES OF HEAVY WATER REACTOR FACILITIES

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 262 days.

(21) Appl. No.: 17/429,725

(22) PCT Filed: Feb. 11, 2020

(86) PCT No.: PCT/KR2020/001915
§ 371 (c)(1),
(2) Date: Aug. 10, 2021

(87) PCT Pub. No.: WO2020/166945
PCT Pub. Date: Aug. 20, 2020

(65) Prior Publication Data
US 2022/0130563 A1     Apr. 28, 2022

(30) Foreign Application Priority Data

Feb. 14, 2019 (KR) .................. 10-2019-0017279

(51) Int. Cl.
*G21D 1/00* (2006.01)
*G21F 9/00* (2006.01)

(52) U.S. Cl.
CPC ............. *G21D 1/003* (2013.01); *G21F 9/001* (2013.01)

(58) Field of Classification Search
CPC ........... G21F 9/001; G21F 9/28; G21D 1/003; Y02E 30/30; Y02E 30/00
See application file for complete search history.

(56) References Cited

FOREIGN PATENT DOCUMENTS

| JP | 2004-212149 | 7/2004 |
|---|---|---|
| JP | 4158657 | 10/2008 |
| JP | 4256349 | 4/2009 |
| KR | 10-2012-0082833 | 7/2012 |
| KR | 10-1298072 | 8/2013 |
| KR | 10-2013-0135749 | 12/2013 |
| KR | 10-2014-0042009 I | 4/2014 |
| KR | 1859359 | 5/2018 |

*Primary Examiner* — Moshe Wilensky
(74) *Attorney, Agent, or Firm* — LEX IP MEISTER, PLLC

(57) ABSTRACT

A radioactive structure dismantling method of a heavy water reactor facility that includes a calandria including a main shell and a sub shell, a calandria vault that receives the calandria therein, and a cover assembly that covers the calandria according to an embodiment, includes: preparing dismantling of the calandria; dismantling a reactor pipe installed in the calandria; dismantling the cover assembly that covers the calandria; dismantling the calandria; and dismantling the calandria vault.

6 Claims, 10 Drawing Sheets

DISMANTLING METHOD OF RADIOACTIVE STRUCTURES OF HEAVY WATER REACTOR FACILITIES

TECHNICAL FIELD

The present invention relates to a radioactive structure dismantling method of a heavy water reactor facility.

BACKGROUND ART

In general, among the nuclear facilities used for nuclear power generation, a heavy water reactor facility includes a calandria and a calandria vault receiving the calandria therein.

As a nuclear fuel injection cylinder for a nuclear reactor of a heavy water reactor type of nuclear power plant, the calandria has a cylindrical pipe structure that injects nuclear fuel during normal operation of the power plant and discharges a bundle of combusted nuclear fuel.

When the calandria, which is a highly radioactive structure, an internal structure, and the calandria vault are dismantled, there is a risk of worker exposure and radiation leakage.

DISCLOSURE

Technical Problem

The present embodiment relates to a radioactive structure dismantling method of a heavy water reactor facility for reducing exposure of workers and promoting safety when the heavy water reactor facility is dismantled.

Technical Solution

A radioactive structure dismantling method of a heavy water reactor facility that includes a calandria including a main shell and a sub shell, a calandria vault that receives the calandria therein, and a cover assembly that covers the calandria according to an embodiment, includes: preparing dismantling of the calandria; dismantling a reactor pipe installed in the calandria; dismantling the cover assembly that covers the calandria; dismantling the calandria; and dismantling the calandria vault.

The preparing the dismantling of the calandria includes: draining a coolant and a moderator filled inside the calandria; controlling a control device of a control rod and an absorbent rod inserted in the calandria; decontaminating a pressure tube that horizontally penetrates the calandria and a calandria tube that surrounds the pressure tube; and drying the calandria.

The calandria further includes an end shield that is connected to the sub shell, and the dismantling of the reactor pipe includes: removing a coolant feeder that supplies the coolant to the calandria; removing an end fitting part that is connected to the end shield; and removing the pressure tube and the calandria tube.

the cover assembly may include a reactivity mechanism deck that is supported by an upper portion of the calandria vault and covers the calandria, an upper guide tube that is vertically connected to the calandria, a side guide tube that is horizontally connected to the calandria, a pressure relief pipe connected to the upper portion of the calandria, and a moderator pipe that is connected to a lower portion and a side surface of the calandria and through which a moderator flows, and the dismantling the cover assembly may include: dismantling the upper guide tube; dismantling the side guide tube; removing the reactivity mechanism deck; removing the pressure relief pipe; and removing the moderator pipe.

The dismantling the calandria may include: supporting the main shell of the calandria by inserting a transfer device to the inside of the calandria vault through the upper portion of the calandria vault; cutting between the main shell and the sub shell of the calandria by using a cutting means; and drawing out the main shell of the calandria from the inside of the calandria vault to the outside of the calandria vault by using the transfer device.

The radioactive structure dismantling method of the heavy water reactor facility further includes dismantling an internal structure of the calandria after dismantling the calandria, wherein the dismantling the internal structure of the calandria vault may include: removing a shielding slab that is provided at a boundary of the calandria vault and the end shield; and removing a liner plate connected to the shielding slab.

The dismantling the calandria vault may include: removing a plurality of shielding balls dispersed in the end shield; removing an upper concrete of the calandria vault; removing the end shield; and removing a lower concrete of the calandria vault.

Advantageous Effects

According to the embodiment, the calandria vault and the calandria received therein can be easily lifted to the outside and dismantled.

In addition, by using the dismantling method of the heavy water reactor facility, the calandria can be dismantled safely and quickly without worker exposure, by remote control.

MODE FOR INVENTION

Figure 1:
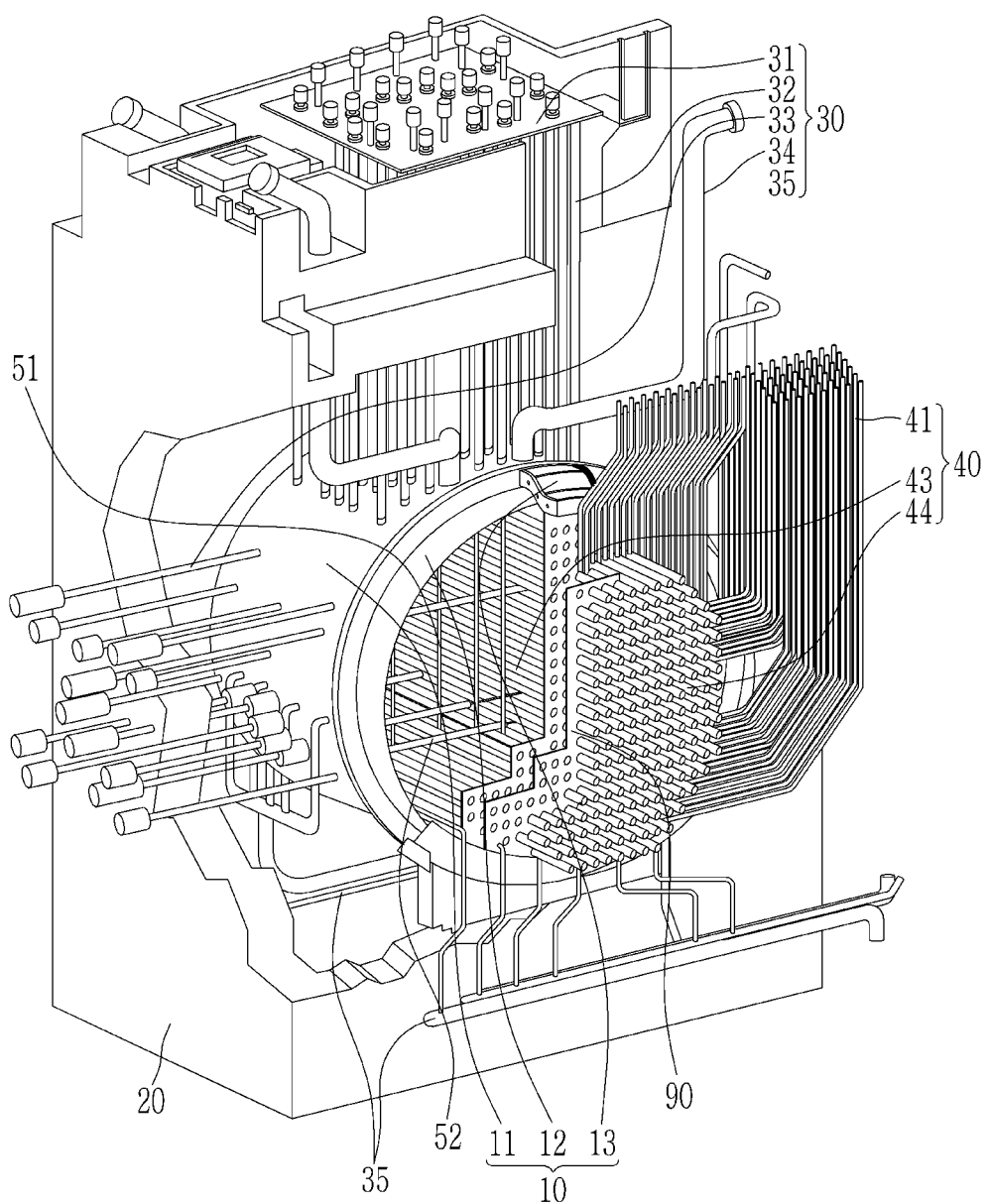
FIG. 1 is a schematic perspective view of a heavy water reactor facility according to an embodiment.

The present invention will be described more fully hereinafter with reference to the accompanying drawings, in which exemplary embodiments of the invention are shown.

The present invention may be implemented in several different forms and is not limited to the embodiments described herein.

In order to clearly explain the present invention, parts that are irrelevant to the description are omitted, and the same reference signs are used for the same or similar constituent elements throughout the specification.

In addition, since the size and thickness of each component shown in the drawings are arbitrarily indicated for convenience of explanation, the present invention is not necessarily limited to as illustrated.

Figure 2:
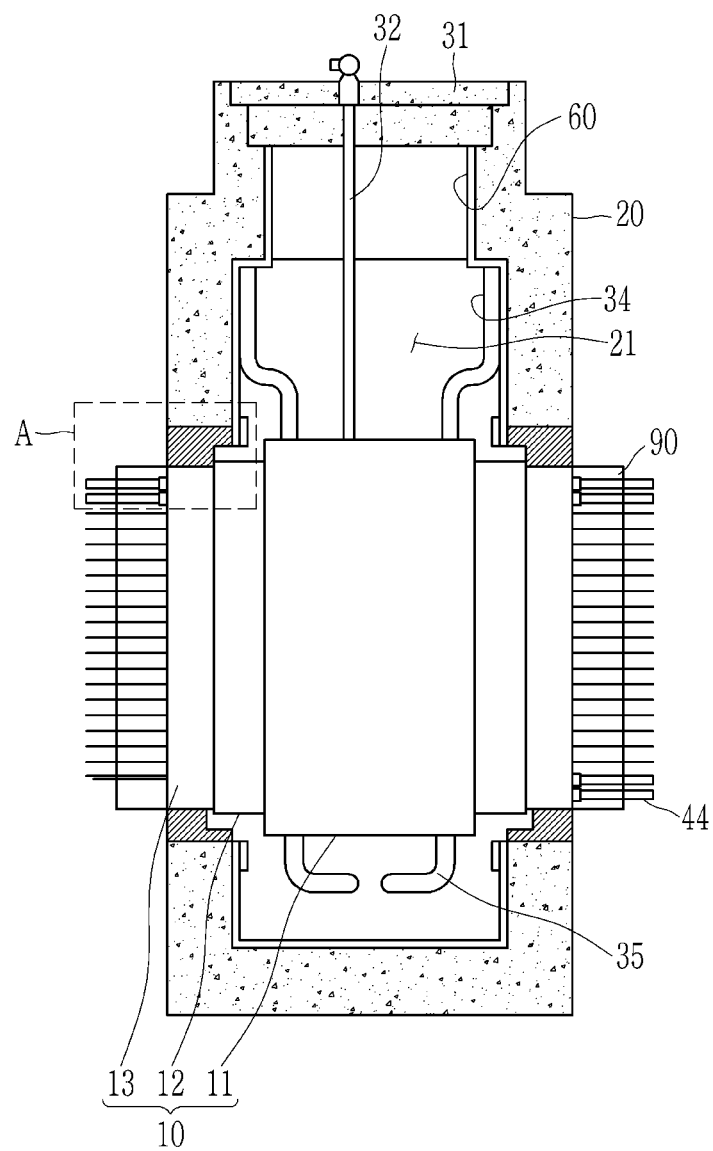
FIG. 2 is a schematic side view of the heavy water reactor facility according to the embodiment.
Figure 3:
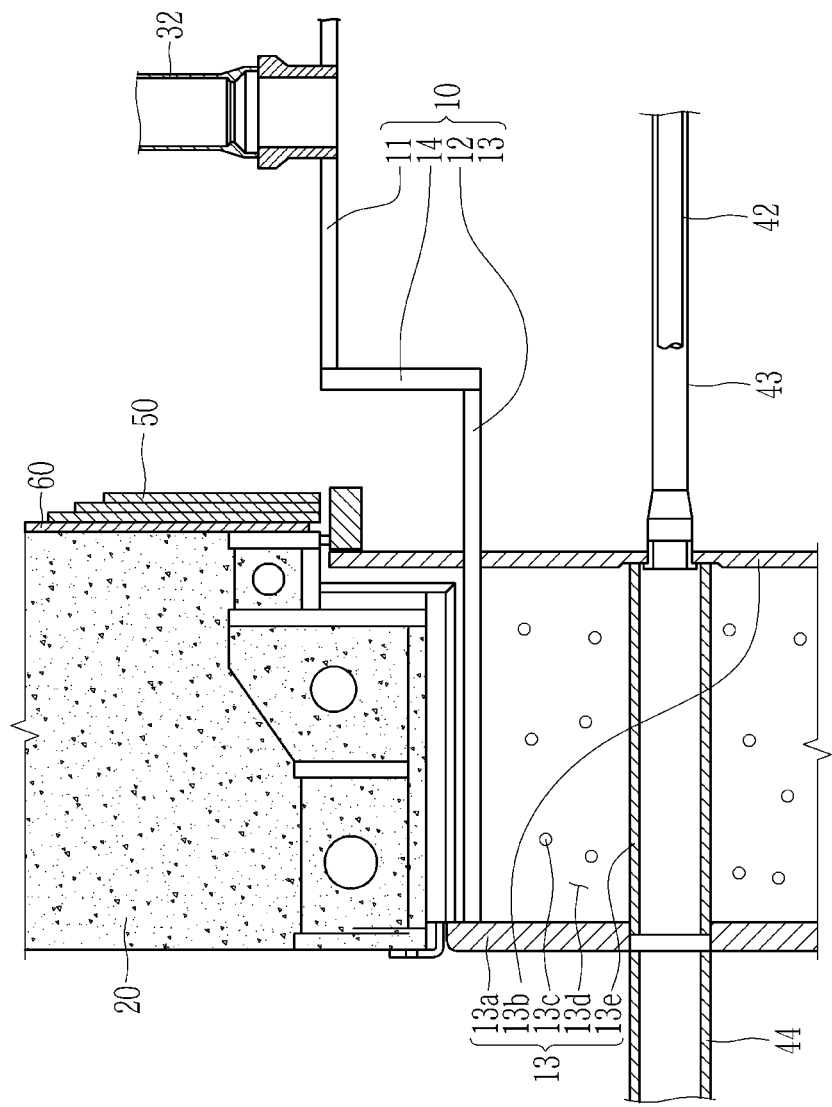
FIG. 3 is an enlarged view of the part A of FIG. 2.
Figure 4:
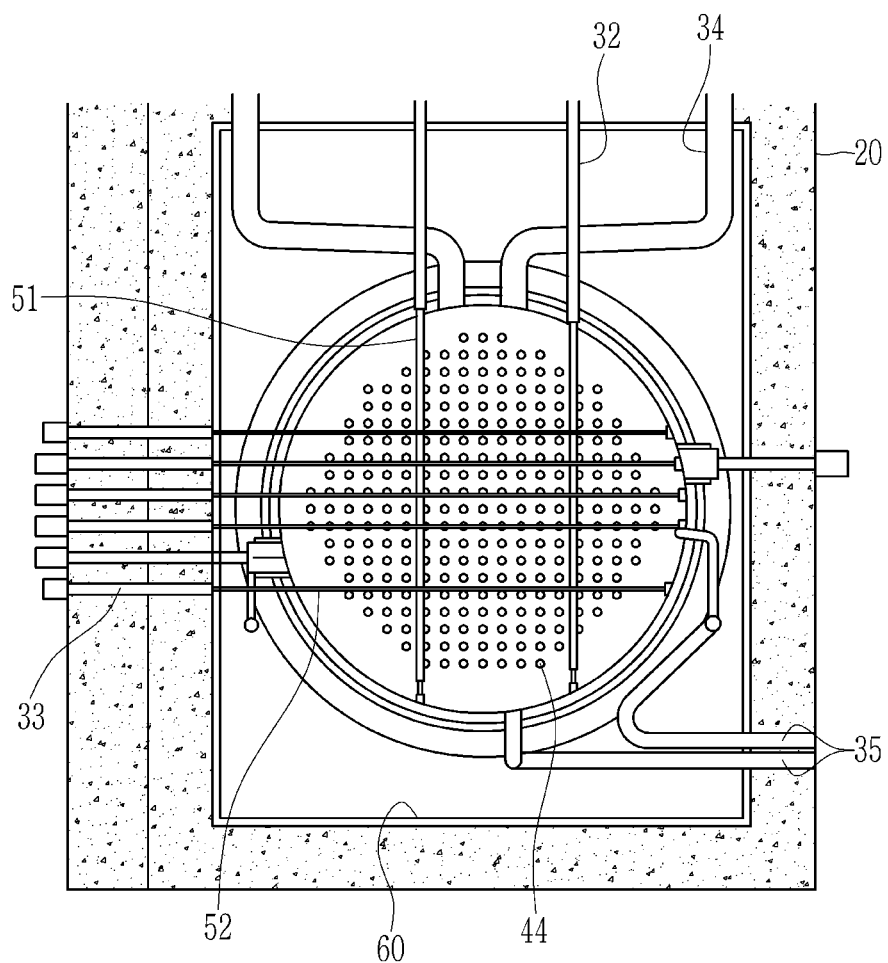
FIG. 4 is a schematic front view of the heavy water reactor facility according to the embodiment.

FIG. 1 is a schematic perspective view of a heavy water reactor facility according to an embodiment, FIG. 2 is a schematic side view of the heavy water reactor facility according to the embodiment, FIG. 3 is an enlarged view of the part A of FIG. 2, and FIG. 4 is a schematic front view of the heavy water reactor facility according to the embodiment.

Hereinafter, a CANDU type of heavy water reactor facility including a calandria as a heavy water reactor facility will be described as an example, but the heavy water reactor facility is not limited thereto.

As shown in FIG. 1 to FIG. 4, the heavy water reactor facility includes a calandria 10, a calandria vault 20 that accommodates the calandria 10 in an interior portion 21, a cover assembly 30 that includes a reactivity mechanism deck 31 disposed in an upper portion 22 of the calandria vault 20 to cover the calandria 10, and a reactor pipe 40 installed in the calandria 10.

The calandria 10 may include a main shell 11 disposed in a center, sub shells 12 disposed at opposite ends of the main shell 11, and end shields 13 connected to the sub shells 12.

The end shield 13 may include a fueling tube sheet 13a and a calandria tube sheet 13b that face each other, and a plurality of shield balls 13c and shielding water 13d that fill between the calandria tube sheet 13b and the fueling tube sheet 13a. The shield ball 13c may be a ball made of carbon steel, and the shielding water 13d may be light water.

The calandria vault 20 may accommodate the calandria 10 in the interior portion 21 by supporting the end shields 13.

The cover assembly 30 may include a reactivity mechanism deck 31 that is supported by an upper portion of the calandria vault 20 and thus covers the calandria 10, an upper guide tube 32 that vertically connects the reactivity mechanism deck 31 and the calandria 10, a side guide tube 33 that is horizontally connected to the calandria 10, a pressure relief pipe 34 that is connected with the upper portion of the calandria 10 and discharges an internal pressure of the calandria 10 to the outside, and a moderator pipe 35 that is connected with a side surface and a lower portion of the calandria 10 and through which a moderator flows in and flows out. Control devices such as a control rod and an absorbent rod can be inserted into the upper guide tube 32 and the side guide tube 33.

The reactor pipe 40 may include a coolant feeder 41 that supplies a coolant to the calandria 10, a pressure tube 42 that horizontally penetrates the calandria 10, a calandria tube 43 that is connected with the end shield 13 while surrounding the pressure tube 42, and an end fitting part 44 that is connected to one side of the end shield 13. The coolant feeder 41 is connected to opposite ends of the pressure tube 42 to supply the coolant to the pressure tube 42.

The calandria tube 43 may be connected to the calandria tube sheet 13b of the end shield 13.

The upper guide tube 32 is connected with an upper end of a guide pipe 51 that is vertically disposed in the calandria 10, and the side guide tube 33 may be connected with one end of a poisonous material injection pipe 52 that is horizontally disposed in the calandria 10. The guide pipe 51 is a pipe for guiding the reactivity control and monitoring device, and the poisonous material injection pipe 52 is a pipe for injecting a poisonous material for stopping the reactor.

An insulation material 90 may be installed on both sides of the calandria 10. The insulation material 90 may cover the surface of the end fitting part 44 exposed to the outside of the calandria 10 for nuclear fuel replacement. Such an insulation material 90 may be made of aluminum or the like, and but is not limited thereto.

Hereinafter, a method for dismantling a radioactive structure of the heavy water reactor facility illustrated in FIG. 1 to FIG. 4 will be described in detail.

Figure 5:
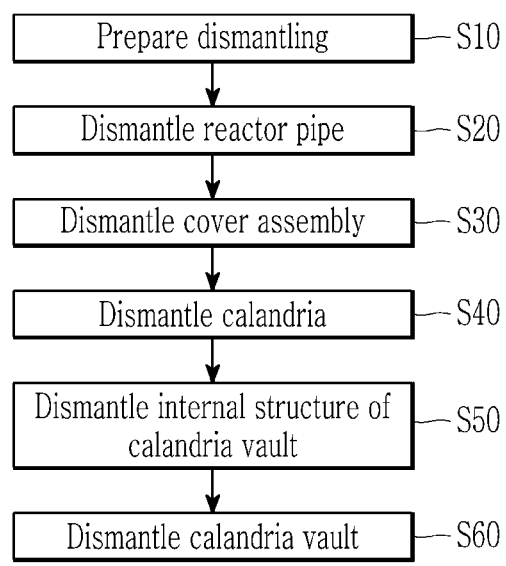
FIG. 5 is a flowchart of a radioactive structure dismantling method of the heavy water reactor facility according to an embodiment.

FIG. 5 is a flowchart of a radioactive structure dismantling method of the heavy water reactor facility according to an embodiment.

As shown in FIG. 5, dismantling of the calandria 10 is prepared (S10).

This will be described in detail hereinafter.

First, the coolant and the moderator filled inside of the calandria 10 and inside of the pressure tube 42 are drained. The coolant and the moderator may be made of heavy water. In addition, the coolant filled in the calandria vault 20 is drained. The coolant filled inside calandria vault 20 may be made of light water.

In addition, the control rod and the absorbent rod inserted into the calandria 10 are removed. The control rod and the absorbent rod are inserted into the calandria 10 through the upper guide tube 32 and the side guide tube 33 connected to the calandria 10. In this case, a measuring instrument and an actuator inserted in calandria 10 can be removed.

In addition, the inside of calandria 10 and the inside of pressure tube 42 are decontaminated. Since the coolant and the moderator contaminated with radioactivity are filled in the calandria 10 and the pressure tube 42, a decontamination process is carried out to decontaminate the inside of the calandria 10 and the inside of the pressure tube 42.

In addition, the inside of the calandria 10 and the inside of the pressure tube 42 are vacuum-dried to complete the preliminary preparation for dismantling the calandria 10.

Next, the reactor pipe 40 installed in the calandria 10 is dismantled (S20).

Figure 6:
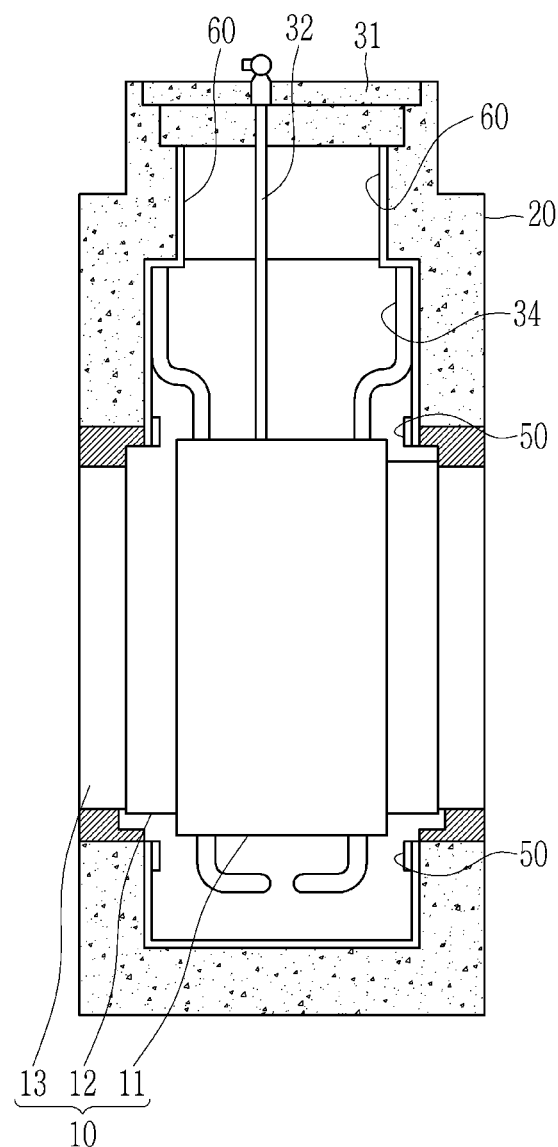
FIG. 6 is provided for description of a state in which the reactor pipe of the heavy water reactor facility is dismantled according to the embodiment.

FIG. 6 is provided for description of a state in which the reactor pipe of the heavy water reactor facility is dismantled according to the embodiment.

Hereinafter, dismantling of the reactor pipe 40 will be described in detail with reference to FIG. 1 to FIG. 6.

First, the insulation material 90 that covers the surface of the end fitting part 41 exposed to the outside of the calandria 10 is removed.

In addition, the coolant feeder 41 that supplies the coolant to the calandria 10 is removed. Then, the end fitting part 44 connected to the end shield 13 can be removed.

In addition, the pressure tube 42 that horizontally penetrates the calandria 10 and the calandria tube 43 that surrounds the pressure tube 42 can be removed. In this way, the exposure of workers can be minimized by removing the heavily irradiated pressure tube 42 and calandria tube 43 in advance.

Next, the cover assembly 30 that covers the calandria 10 is dismantled (S30).

Figure 7:
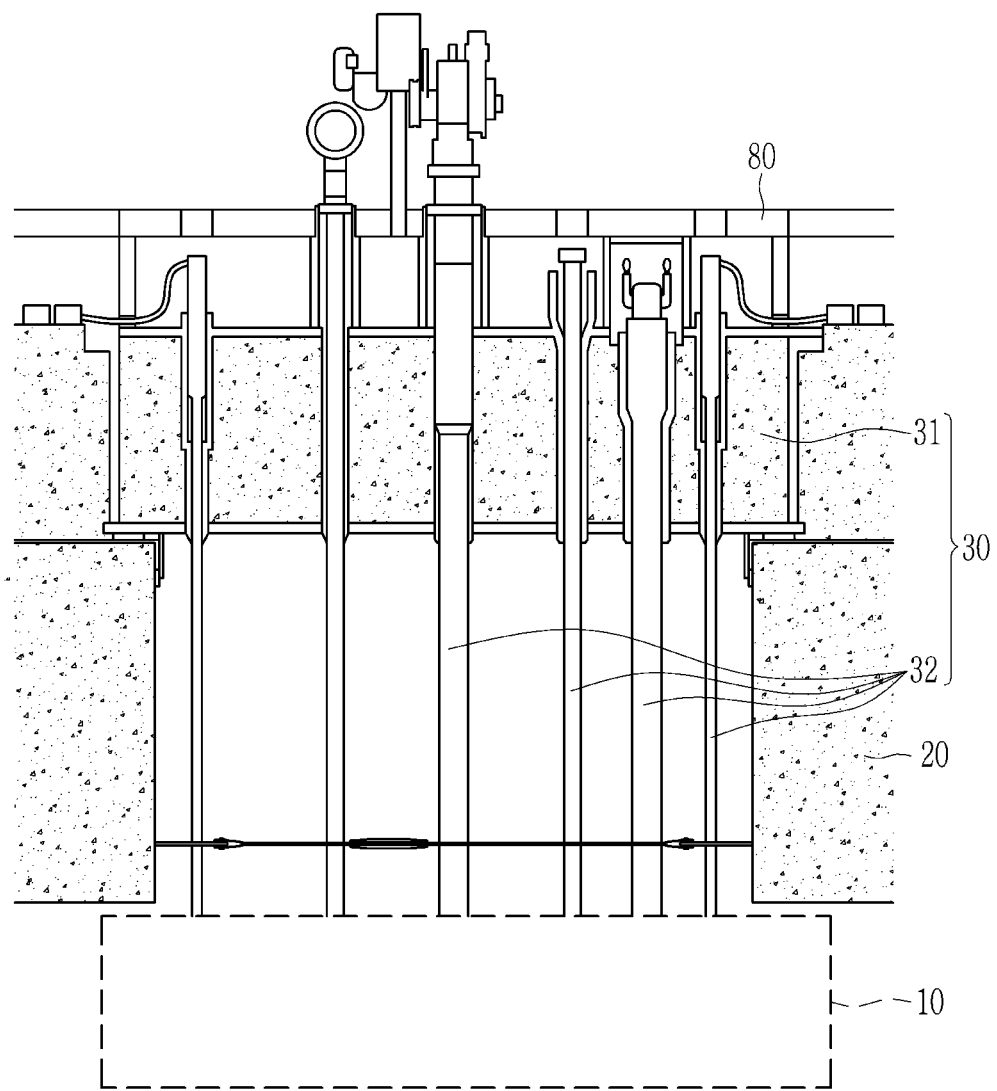
FIG. 7 illustrates a part of the cover assembly of the heavy water reactor facility according to the embodiment in detail.
Figure 8:
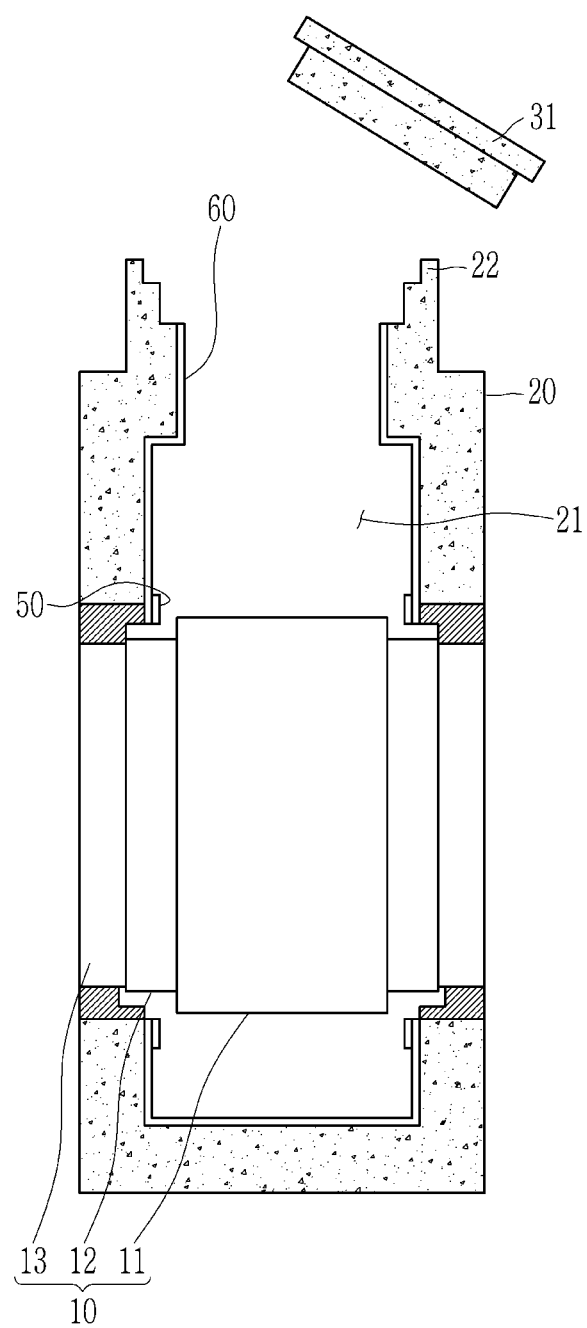
FIG. 8 is provided for description of a state in which the cover assembly of the heavy water reactor facility is dismantled according to the embodiment.

FIG. 7 illustrates a part of the cover assembly of the heavy water reactor facility according to the embodiment in detail, and FIG. 8 is provided for description of a state in which the cover assembly of the heavy water reactor facility is dismantled according to the embodiment.

Hereinafter, dismantling of the cover assembly 30 will be described in detail with reference to FIG. 1 to FIG. 5 and FIG. 7 and FIG. 8.

First, a tread plate 80 installed in the upper portion of the reactivity mechanism deck 31 is removed, and the upper guide tube 32 that is vertically connected to the calandria 10 is dismantled. Next, the side guide tube 33 that is horizontally connected to the calandria 10 is dismantled. Next, the reactivity mechanism deck 31 is removed from the calandria vault 20. Next, the pressure relief pipe 34 disposed above the calandria 10 is dismantled. Subsequently, the moderator pipe 35 disposed in the side surface and the lower portion of calandria 10 is dismantled.

Then, the internal structures such as the guide pipe 51 and the poisonous material injection pipe 52 disposed inside the calandria 10 are drawn out to the outside of the calandria 10 and dismantled.

The guide pipe 51 is a pipe for guiding the reactivity control and monitoring device, and the poisonous material injection pipe 52 is a pipe for injecting a poison material for stopping the reactor.

Next, the calandria 10 is dismantled (S40).

Figure 9:
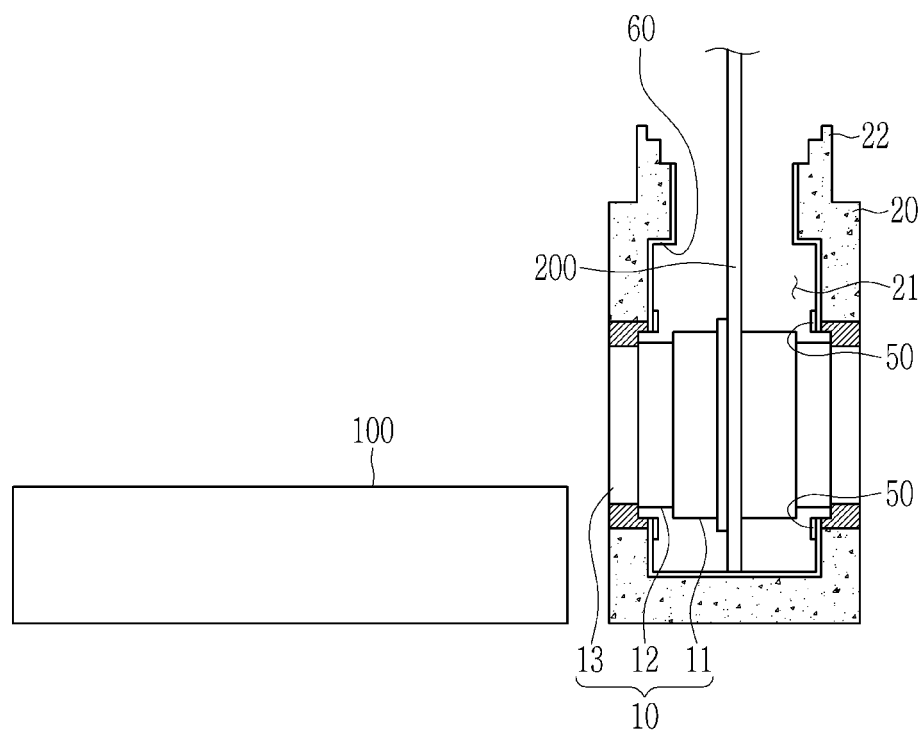
FIG. 9 is provided for description of a state of dismantling the calandria of the heavy water reactor facility according to the embodiment.

FIG. 9 is provided for description of a state of dismantling the calandria of the heavy water reactor facility according to the embodiment.

Hereinafter, dismantling of the calandria 10 will be described in detail with reference to FIG. 1 to FIG. 5 and FIG. 9.

First, the upper portion 22 of the calandria vault 20 is expanded. An opening area of the upper 22 of the calandria vault 20 from which the reactivity mechanism deck 31 has been removed can be enlarged by a cutting means such as a wire saw. Since the upper portion 22 of the calandria vault 20 is expanded, a transfer device 200 can be easily inserted into the interior portion 21 of the calandria vault 20, and the calandria 10 can be easily drawn out from the interior portion 21 of the calandria vault 20.

The main shell 11 of the calandria 10 is supported by inserting the transfer device 200 into the interior portion 21 of the calandria vault 20 through the expanded upper portion 22 of the calandria vault 20.

Then, between the main shell 11 and the sub shell 12 of the calandria 10 is cut by using the cutting device 100.

The cutting device 100 is inserted into the calandria 10 through a pressure pipe penetration 13e formed in the end shield 13 to cut a connection portion 14 between the main shell 11 and the sub shell 12, or may cut the connection portion 14 between the main shell 11 and the sub shell 12 from the outside of the calandria 10 through the transfer device 200.

Then, the cut main shell 11 is drawn out of the calandria vault 20 using the transfer device 200.

Figure 10:
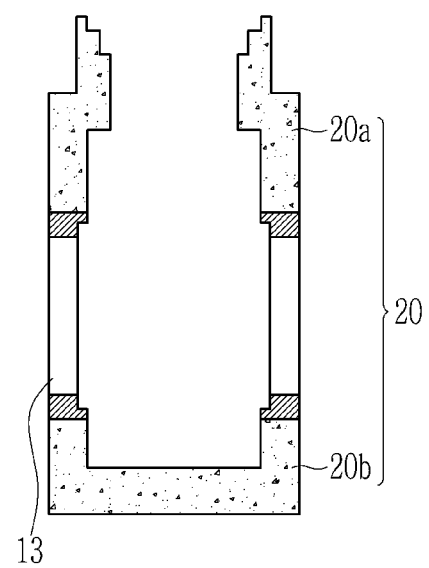
FIG. 10 is provided for description of a state of dismantling the internal structures of the calandria vault of the heavy water reactor facility according to the embodiment.

Next, the internal structures of the calandria vault 20 are dismantled (S50). FIG. 10 is provided for description of a state of dismantling the internal structures of the calandria vault of the heavy water reactor facility according to the embodiment.

Hereinafter, dismantling of the internal structure of the calandria vault 20 will be described in detail with reference to FIG. 1 to FIG. 5 and FIG. 10.

A shielding slab 50 installed at the boundary between the calandria vault 20 and the end shield 13 can be removed. The shielding slab 50 is installed at the boundary between the calandria vault 20 and the end shield 13. The shielding slab 50 is installed to more completely shield the radiation emitted from the calandria 10. The shielding slab 50 may include a fastening member coupling a plurality of sub-slabs and a plurality of sub-slabs to the calandria vault 20. The shielding slab 50 can be separated from the calandria vault 20 by loosening the fastening member of the shielding slab 50.

Next, as shown in FIG. 8, a liner plate 60 connected to the shielding slab 50 can be removed. Since the liner plate 60 disposed on an inner wall of the calandria vault 20 is fixed to the calandria vault 20 using an anchor, the liner plate 60 can be removed from the inner wall of the calandria vault 20 by removing the anchor. The liner plate 60 is installed on the entire inner wall of the calandria vault 20 to prevent leakage of light water filled inside the calandria vault 20. The liner plate 60 may be made of carbon steel.

Next, the calandria vault 20 is dismantled (S60).

That is, as shown in FIG. 3, the plurality of shield balls 13c dispersed in the end shield 13 can be removed. In this case, the shielding water 13d is also discharged together with the shield ball 13c, and thus the shield ball 13c and the shielding water 13d can be collected together by using a separate collecting device.

In addition, it is possible to remove an upper concrete slab 20a of the calandria vault 20 by using a cutting means such as a wire saw. Then, the end shield 13 can be removed. It is possible to remove the lower concrete slab 20b of the calandria vault 20 using a cutting means such as a wire saw.

As described above, by using the dismantling method of the heavy water reactor facility according to the embodiment, it is possible to easily lift and dismantle the calandria vault 20 and the calandria 10, which is a high radioactive structure stored therein.

While this invention has been described in connection with what is presently considered to be practical embodiments, it is to be understood that the invention is not limited to the disclosed embodiments. On the contrary, it is intended to cover various modifications and equivalent arrangements included within the scope of the appended claims.

The invention claimed is:

1. A radioactive structure dismantling method of a heavy water reactor facility that includes a calandria including a main shell and a sub shell, a calandria vault that receives the calandria therein, and a cover assembly that covers the calandria, comprising:
   preparing dismantling of the calandria;
   dismantling a reactor pipe installed in the calandria;
   dismantling the cover assembly that covers the calandria;
   dismantling the calandria; and
   dismantling the calandria vault,
   wherein:
   the preparing the dismantling of the calandria comprises
   draining a coolant and a moderator filled inside the calandria,
   controlling a control device of a control rod and an absorbent rod inserted in the calandria,
   decontaminating a pressure tube that horizontally penetrates the calandria and a calandria tube that surrounds the pressure tube, and
   drying the calandria.

2. The radioactive structure dismantling method of the heavy water reactor facility of claim 1, wherein:
   the calandria further comprises an end shield that is connected to the sub shell, and
   the dismantling of the reactor pipe comprises
   removing a coolant feeder that supplies the coolant to the calandria,
   removing an end fitting part that is connected to the end shield, and
   removing the pressure tube and the calandria tube.

3. The radioactive structure dismantling method of the heavy water reactor facility of claim 2, wherein
the cover assembly comprises a reactivity mechanism deck that is supported by an upper portion of the calandria vault and covers the calandria, an upper guide tube that is vertically connected to the calandria, a side guide tube that is horizontally connected to the calandria, a pressure relief pipe connected to the upper portion of the calandria, and a moderator pipe that is connected to a lower portion and a side surface of the calandria and through which a moderator flows, and
the dismantling the cover assembly comprises
dismantling the upper guide tube,
dismantling the side guide tube,
removing the reactivity mechanism deck,
removing the pressure relief pipe, and
removing the moderator pipe.

4. The radioactive structure dismantling method of the heavy water reactor facility of claim 3, wherein:
the dismantling the calandria comprises
supporting the main shell of the calandria by inserting a transfer device to the inside of the calandria vault through the upper portion of the calandria vault,
cutting between the main shell and the sub shell of the calandria by using a cutting means, and
drawing out the main shell of the calandria from the inside of the calandria vault to the outside of the calandria vault by using the transfer device.

5. The radioactive structure dismantling method of the heavy water reactor facility of claim 4, further comprising dismantling an internal structure of the calandria after dismantling the calandria,
wherein the dismantling the internal structure of the calandria vault comprises
removing a shielding slab that is provided at a boundary of the calandria vault and the end shield, and
removing a liner plate connected to the shielding slab.

6. The radioactive structure dismantling method of the heavy water reactor facility of claim 4, wherein
the dismantling the calandria vault comprises
removing a plurality of shielding balls dispersed in the end shield,
removing an upper concrete of the calandria vault, and
removing the end shield, and
removing a lower concrete of the calandria vault.

* * * * *